US012790183B2

(12) United States Patent
Roni-Damond

(10) Patent No.: US 12,790,183 B2
(45) Date of Patent: Nov. 10, 2026

(54) METHOD FOR SECURING A CRANE TO THE OCCURRENCE OF AN EXCEPTIONAL EVENT

(71) Applicant: MANITOWOC CRANE GROUP FRANCE, Dardilly (FR)

(72) Inventor: Bruno Roni-Damond, Lyons (FR)

(73) Assignee: MANITOWOC CRANE GROUP FRANCE, Dardilly (FR)

(*) Notice: Subject to any disclaimer, the term of this patent is extended or adjusted under 35 U.S.C. 154(b) by 971 days.

(21) Appl. No.: 17/835,341

(22) Filed: Jun. 8, 2022

(65) Prior Publication Data

US 2022/0402732 A1 Dec. 22, 2022

(30) Foreign Application Priority Data

Jun. 14, 2021 (FR) ..................................... 21/06268

(51) Int. Cl.
*B66C 23/90* (2006.01)

(52) U.S. Cl.
CPC ...... *B66C 23/905* (2013.01); *B66C 2700/084* (2013.01)

(58) Field of Classification Search
CPC ............ B66C 23/905; B66C 2700/084; B66C 23/88–94
(Continued)

(56) References Cited

U.S. PATENT DOCUMENTS 6,496,766 B1 * 12/2002 Bernold ................ B66C 15/065 340/685
6,744,372 B1 * 6/2004 Shaw ...................... B66C 15/06 340/685

(Continued)

FOREIGN PATENT DOCUMENTS

EP 0 535 339 A1 4/1993
EP 708053 A1 * 4/1996 ............ B66C 23/90

(Continued)

OTHER PUBLICATIONS

Ishihara H—English description of JP-2002326785-A via Espacenet Patent Translate, retrieved Apr. 4, 2025. (Year: 2025).*

(Continued)

*Primary Examiner* — Erin M Piateski
*Assistant Examiner* — Paul Allen
(74) *Attorney, Agent, or Firm* — Cook Alex Ltd.

(57) ABSTRACT

A securing method for securing a crane on the occurrence of an exceptional event, the crane including a control-command system connected to actuators of the crane and integrated within a processing unit of the crane, the processing unit connected to movement, load and safety sensors placed on elements of the crane and configured to deliver information from events representative of exceptional events, wherein the securing method includes establishing a list of exceptional events detectable by the movement, load and safety sensors, associating levels of severity to each exceptional event, evaluating the level of severity of a detected exceptional event based on corresponding event information, switching from a nominal operating mode to a secure operating mode by applying a safety instruction associated with a severity level for the detected exceptional event, and emitting an alert message informing of the occurrence of the exception event.

18 Claims, 3 Drawing Sheets

(58) Field of Classification Search
USPC .................. 212/276–281; 701/50, 29.1–34.4
See application file for complete search history.

(56) References Cited

U.S. PATENT DOCUMENTS

2002/0032511 A1* 3/2002 Murakami ............... G08G 1/20 701/50
2005/0192732 A1* 9/2005 Narisawa .............. B66C 23/905 700/83
2006/0250102 A1* 11/2006 Payne ................ G05B 19/4062 318/569
2008/0053945 A1* 3/2008 Schneider ............. B66C 15/045 212/270
2008/0255742 A1* 10/2008 Morisset ................. B60R 25/04 701/1
2009/0114612 A1* 5/2009 Nelson .................. B66C 15/045 212/276
2010/0175484 A1* 7/2010 Saigh .................. G01M 5/0083 73/775
2010/0259359 A1* 10/2010 Ishikawa ................... B60L 3/04 340/5.2
2013/0345938 A1* 12/2013 Ruoss ................... B66C 23/905 701/50
2015/0122761 A1* 5/2015 Ford ....................... B66C 19/00 212/276
2015/0142174 A1* 5/2015 Ford ....................... B66C 13/18 700/275
2018/0018641 A1 1/2018 Jussel et al.
2018/0065835 A1* 3/2018 Haase ..................... B66C 23/88
2018/0179029 A1* 6/2018 Schoonmaker ....... B66C 23/905
2019/0062130 A1* 2/2019 Benton ................. B66C 23/905
2019/0112165 A1* 4/2019 Palberg ................. B66C 13/063
2020/0048867 A1* 2/2020 Kimura ............... F02N 11/0803
2021/0295460 A1* 9/2021 Tamazato ............. G06Q 50/265
2023/0331524 A1* 10/2023 Wijning .................. B66C 23/52

FOREIGN PATENT DOCUMENTS

EP 3495310 A1 * 6/2019 ........... B66C 15/045
JP 2002326785 A * 11/2002
JP 2010083659 A * 4/2010
JP 2013221527 A * 10/2013

OTHER PUBLICATIONS

Kurio N—English description of JP-2010083659-A via Espacenet Patent Translate, retrieved Apr. 5, 2025. (Year: 2025).*
Ishii M—English description of JP-2013221527-A via Espacenet Patent Translate, retrieved Apr. 4, 2025. (Year: 2025).*
Bourgeois S—English description of EP-3495310-A1 via Espacenet Patent Translate, retrieved Apr. 4, 2025. (Year: 2025).*
Search Report issued in connection with FR Pat. Appl. 21/06268, dated Mar. 8, 2022.

* cited by examiner

METHOD FOR SECURING A CRANE TO THE OCCURRENCE OF AN EXCEPTIONAL EVENT

FIELD

The invention concerns a method for securing a crane to the occurrence of an exceptional event as well as the crane for which this securing method is implemented.

BACKGROUND

The cranes are designed by the crane manufacturers to be used under certain operating conditions with limit values for these operating conditions, these limit values generally being fixed by the manufacturer, by a standard relating to the crane, by regulations or even by specific conditions of use of the crane.

For example, if a tower crane is out of service but it is subject to a wind different from the usual conditions taken for the design of tower cranes, for example a non-laminar wind occurring due to an influence of a nearby obstacle of the crane, it may be subjected locally to a high wind speed, or to a variation in the speed and direction of the wind which may cause the upper part of the crane to rotate continuously about its pivot axis, in oscillation about the axis of rotation, or even to position itself across the wind, thus considerably increasing its surface to the exposed wind. Uncontrolled efforts and movements thus generated can damage the structure of the crane, its mechanisms, its foundations and anchorages without causing it to tilt. Thus, if a storm occurs when the crane is not in operation, and the influence of the wind locally experienced by the crane generates efforts or movements of the crane that do not conform to the normal behavior of a crane in a flow of laminar wind, it is said that an exceptional event has taken place in the crane.

This exceptional event then requires an inspection of the state of the crane in order to verify that it can be operated without danger. Since the crane was not in operation when this exceptional event occurred, no inspection will be carried out since the occurrence of the exceptional event will not have been detected and the exceptional event will not have been identified.

Moreover, if for example during the operation of a tower crane, a sling breakage occurs, the crane is then subjected to a shock wave likely to deform the structure as well as the foundations of the crane. In this case, the crane simply stops by overload detection, and the crane driver can restart the crane normally even by ignoring a series of instructions provided by the crane manufacturer, such as instructions to carry out an inspection of the frame before returning the crane to service. The crane driver would then risk putting a damaged crane back into service.

The document US2018/0018641 describes a method for estimating a lifetime of a crane component, which takes into account the work cycles, the loads, and which detects in particular an imminent failure of the crane component. The method then issues an alert informing the crane driver and can also stop or limit movements of the crane. However, despite the fact that the method described in document US2018/0018641 emits an alert informing the crane driver of an impending failure of the crane component, the crane driver can choose to ignore this alert message and continue to operate the crane. Furthermore, the alert message emitted by the method described in document US2018/0018641 concerns an imminent failure of a component of the crane but not the occurrence of an exceptional event which would not result in the imminent failure of a component such as a strong wind which would have tilted the frame of the crane slightly and which would therefore require an adjustment of the frame without however generating a risk of an imminent flaw in the crane.

SUMMARY

The present invention aims to solve all or part of the drawbacks mentioned above.

The technical problem at the basis of the invention relates to implementing a securing method for securing the crane on the occurrence of an exceptional event which is of simple and economical structure, and which makes it possible to remedy a non-detection of the occurrence of an exceptional event on a crane, or non-compliance with the crane manufacturer instructions for putting the crane back into service after the occurrence of the exceptional event.

To this end, the subject of the present invention is a securing method for securing a crane on the occurrence of an exceptional event from among a plurality of predefined exceptional events, the crane comprising a control-command system connected to actuators of the crane for managing movements of the crane and of a load suspended from the crane and integrated within a processing unit of the crane, the processing unit being connected to movement, load and safety sensors placed on elements of the crane and delivering respective event information representative of the exceptional events, and the securing method comprises the following steps of:

- establishing a list of exceptional events detectable by means of the movement, load and safety sensors and its storage in a memory unit connected to the processing unit;
- associating, with each exceptional event of the exceptional events list, several levels of severity, each level of severity being a function of a value of the event information of at least one of the movement, load and safety sensors;
- associating, with each exceptional event and for each level of severity, a safety instruction relating to the actuators and defining at least one degree of limitation of at least one movement of the crane;
- the crane operating in a nominal operating mode, detection by the control-command system of an exceptional event from the list of exceptional events according to the event information from at least one of the movement, load and safety sensors;
- evaluating by the control-command system the level of severity of the exceptional event according to the value of the corresponding event information;
- switching to secure operation, which consists in the control-command system switching the crane from the nominal operating mode to a secure operating mode in which the control-command system applies the safety instruction associated with the level of severity evaluated for the exceptional detected event;
- emitting by the control-command system of an alert message informing of the occurrence of the exceptional event.

According to one possibility, an alert message relating to the exceptional event, and possibly to the level of severity associated with the exceptional event, is associated with the safety instruction.

The application of the safety instructions implies that the control-command system blocks the movements of the crane or imposes limitations on the movements of the crane.

The securing method may further have one or more of the following characteristics, taken alone or in combination.

According to one possibility, the list of exceptional events comprises at least one critical exceptional event associated with at least one level of critical severity among the several levels of severity associated with said critical exceptional event, and in which after the switching of the crane in secure operation following the detection of said critical exceptional event and the evaluation of said level of critical severity, said securing method implements a phase of return to nominal operation comprising:

- a reception by the control-command system of an unlocking code;
- a switching of the crane by the control-command system from the secure operating mode to the nominal operating mode, in response to the reception of said unlocking code.

It is only on condition of having received the unlocking information that the control-command system switches the crane from the secure operating mode to the nominal operating mode.

The return to nominal operation phase may comprise a step of entering the unlocking code on an entering interface in communication with the control-command system.

The return to nominal operation phase may further comprise a step of identifying the unlocking code received in a series of unlocking codes pre-recorded in the memory unit.

According to one possibility, at least one critical exceptional event is associated with at least one non-critical severity level distinct from the critical severity level(s) and in which, after the switching to secure operation following the detection of said critical exceptional event and the evaluation of said non-critical severity level, said securing method implements a return to nominal operation phase comprising:

- an emission by the control-command system of a series of instructions characterizing the procedure to be followed for a return to the nominal operating mode;
- a switching of the crane by the control-command system from the secure operating mode to the nominal operating mode, in response to effective execution of the series of instructions.

According to one possibility, the list of exceptional events comprises at least one non-critical exceptional event, distinct from the critical exceptional event(s), and in which, after switching to secure operation following the detection of said non-critical exceptional event and regardless of the assessment of the associated level of severity, said securing method implements a return to nominal operation phase comprising:

- an emission by the control-command system of a series of instructions characterizing the procedure to be followed for a return to the nominal operating mode;
- a switching of the crane by the control-command system from the secure operating mode to the nominal operating mode, in response to an effective execution of the series of instructions.

The secure operating mode of the crane can be selected from the following operating modes:

- «degraded 0» mode, in which only movements necessary to make the crane safe, e.g., movements to bring the crane closer to or within one or more operating condition limits, are authorized;
- «degraded 1» mode, in which the crane operates at a fraction of its maximum load or moment capacities;
- «degraded 2» mode, in which the crane operates at a fraction of its speed capacity.

According to one possibility, the «degraded 1» and «degraded 2» modes can be activated simultaneously by the control-command system.

The list of exceptional events may comprise at least the following event: excessive exceedance of a measured temperature, the associated event information corresponding to a measured temperature.

The list of exceptional events may comprise at least the following event: intensive use of the crane, the associated event information corresponding to a load spectrum or to a load factor calculated from a history of use of the crane.

The list of exceptional events may comprise at least the following event: a loss of a load from the crane, the associated event information corresponding to a measured mass of the load lifted by the crane.

The list of exceptional events may comprise at least the following event: an overload of the crane, the associated event information corresponding to a measured mass of the load carried by the crane.

The list of exceptional events may comprise at least the following event: an accidental overload of the crane in operation greater than 125% of a maximum load of use of the crane, the associated event information corresponding to a measurement permanent damage by means of a load measurement sensor.

The list of exceptional events may comprise at least the following event: a collision of the crane with an obstacle, the associated event information corresponding to a collision alarm signal transmitted by an anti-collision system mounted on the crane.

The list of exceptional events may comprise at least the following event: a wind speed greater than a defined wind speed limit, the associated event information corresponding to a measurement of the wind speed.

The list of exceptional events may comprise at least the following event: detection of autorotation or oscillation of the crane, the associated event information corresponding to a moment of rotation of the crane measured using an accelerometer.

The list of exceptional events may comprise at least the following event: a detection of the crane being put across in the wind, the associated event information corresponding to a measurement of a direction of the wind using one or more weather vanes.

The list of exceptional events may comprise at least the following event: a detection of inappropriate behavior of the crane, the associated event information being detected by the control-command system.

The list of exceptional events may comprise at least the following event: a crushing of the foundations of the crane, the associated event information corresponding to a measurement of an angle of inclination of the base of the crane.

The present invention further relates to a crane comprising:

- a processing unit connected to movement, load and safety sensors placed on elements of the crane and delivering respective event information representative of exceptional events;
- a memory unit connected to the processing unit, and storing a list of exceptional events detectable by means of movement, load and safety sensors, each exceptional event being associated with several levels of severity, each level of severity being a function of a value of the event information of at least one of the movement, load and safety sensors, and in which each exceptional event and for each level of severity is associated a safety instruction relating to the actuators and defining at least one degree of limitation of at least one movement of the crane;

a control-command system connected to actuators of the crane to manage movements of the crane and of a load suspended from the crane and integrated within the processing unit of the crane;

said control-command system being configured for:

the crane operating in a nominal operating mode, detecting an exceptional event from the list of exceptional events according to the event information from at least one of the movement, load and safety sensors;

assessing the level of severity of the exceptional event according to the value of the corresponding event information;

switching the crane from the nominal operating mode to a secure operating mode in which the control-command system applies the safety instruction associated with the level of severity assessed for the detected exceptional event;

emitting an alert message informing of the occurrence of the exceptional event.

BRIEF DESCRIPTION OF THE DRAWINGS

The invention will be better understood with the aid of the detailed description which is set out below with regard to the appended drawings in which.

DESCRIPTION

Figure 1:
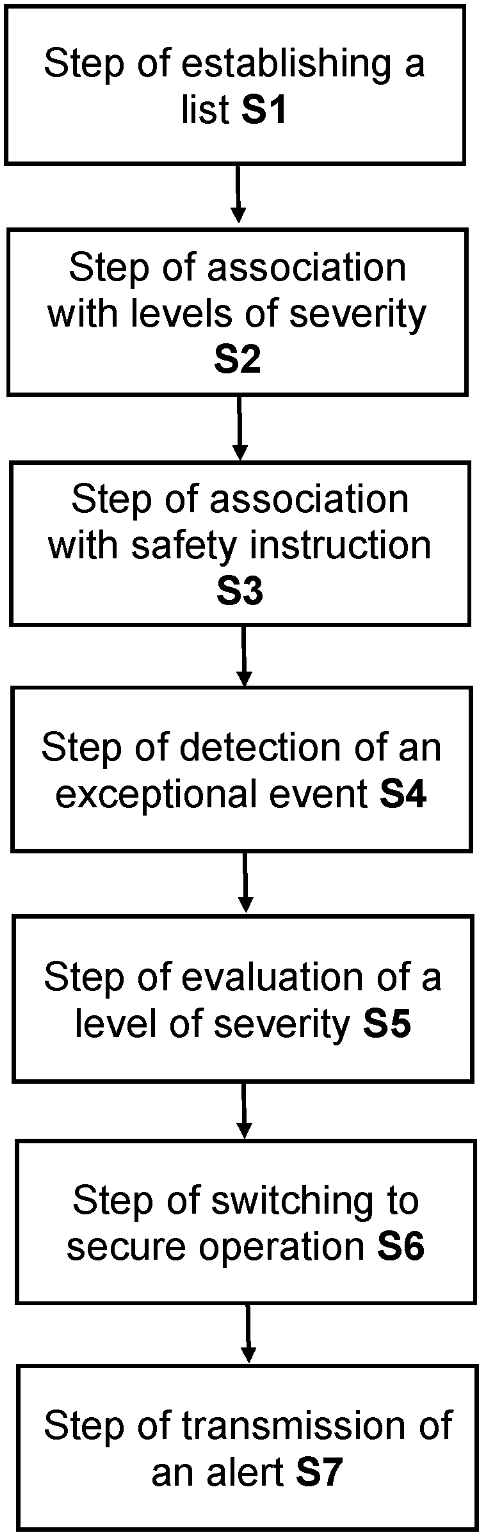
FIG. 1 is a flowchart presenting the main steps of the securing method.

In the detailed description which will follow of the figures defined above, the same elements or the elements performing identical functions may retain the same references so as to simplify the understanding of the invention.

The invention concerns a securing method for securing a crane 1 to the occurrence of an exceptional event.

The exceptional event corresponds to a recording of a stress on the crane 1 which exceeds the design limits defined by the manufacturer of the crane 1 or the limits of use defined by the manufacturer but also by third-party entities, such as a crane owner, a crane operator, a crane user or crane driver or even local regulations.

The crane 1 comprises a control-command system 20 connected to actuators 40, 41, 42 of the crane 1 to manage movements of the crane 1 and of a load 5 suspended from the crane 1 and integrated within a processing unit 2 of the crane 1, the processing unit 2 being connected to movement, load and safety sensors 3 placed on elements of the crane 1 (such as for example a mast 10 or a jib 11 of the crane 1) and delivering respective event information representative of exceptional events.

The actuators may comprise at least one of the following actuators: a motorized lifting system 40 allowing a lifting and a lowering of the load 5, a motorized distribution system 41 allowing a distribution of the load 5 along the jib 11 by moving a distribution trolley 12, a motorized orientation system 42 allowing an orientation of the jib 11, a motorized translation system allowing the crane 1 to be translated, a motorized lifting system allowing a lifting of a lifting jib (or luffing jib).

The control-command system 20, based on movement, load and safety sensors 3 informing the processing unit 2, has the ability to analyse the crane environment and thus detect the exceptional event.

Table 1 lists some examples of exceptional events as well as respectively corresponding sensors chosen among the movement, load and safety sensors 3, which can be standard sensors and/or optional sensors to be installed on the crane 1 to detect the exceptional event according to a nature of said exceptional event.

TABLE 1

| Exceptional event | Standard Sensor | Optional Sensor |
|---|---|---|
| an excessive exceedance of a measured temperature | Temperature sensor in an electrical cabinet or motor | — |
| an intensive use of the crane | Event recorder | digital twin |
| a loss of a load from the crane | Event recorder | — |
| a crane overload | Event recorder | — |
| a collision of the crane with an obstacle | Event recorder | — |
| a wind speed greater than a set wind speed limit | Anemometer Or Event recorder | |
| a detection of autorotation or oscillation of the crane | Anemometer Or Event recorder | Anemometer or wind vane or digital twin |
| a crushing of the foundations of the crane | inclinometer | inclinometer |

Advantageously, the crane 1 can be configured to have a digital twin, that is to say a digital simulation model which is updated and whose properties change as the properties of the crane change.

Advantageously, the digital twin is configured to allow the operation of the crane 1 to be adjusted based on a history of use of the crane 1 and analysis data from the crane manufacturer. In particular for condition-based maintenance and fault detection by fingerprint.

Thanks to the digital twin, a crane driver can check the validity of the assumptions adopted for the installation of the crane 1.

Advantageously, the exceptional event can be detected by the crane 1 itself or by its digital twin.

The occurrence of the exceptional event can be recorded in the event recorder of the control-command system 20 of the crane 1.

The occurrence of the exceptional event can also be recorded in the digital twin, with a return to service of the crane 1, whose terms are clearly identified.

FIG. 1 presents steps of the described securing method according to one example.

The securing method comprises a step of establishing a list S1 consisting in establishing a list of exceptional events detectable by means of movement, load and security sensors and its storage in a memory unit 21 connected to the processing unit 2.

The list of exceptional events may comprise an excessive exceedance of a measured temperature, associated event information corresponding to a measured temperature.

The list of exceptional events may further comprise intensive use of the crane 1, the associated event information corresponding to a load spectrum or to a load factor calculated from a history of use of the crane 1.

The list of exceptional events may further comprise a loss of a load 5 from the crane 1, the associated event information corresponding to a measured mass of the load 5 lifted by the crane 1.

The list of exceptional events may further comprise an overload of the crane 1, the associated event information corresponding to a measured mass of the load 5 carried by the crane 1.

The list of exceptional events may comprise an accidental overload of the crane 1 in operation greater than 125% of a maximum using load of the crane 1, the associated event information corresponding to a measurement of permanent damage by means of a load measurement sensor.

The list of exceptional events may further comprise a collision of the crane 1 with an obstacle, the associated event information corresponding to a collision alarm signal transmitted by an anti-collision system mounted on the crane 1.

The list of exceptional events may further comprise a wind speed greater than a defined wind speed limit, the associated event information corresponding to a measurement of the wind speed.

The list of exceptional events may further comprise a detection of autorotation or oscillation of the crane 1, the associated event information corresponding to a moment of rotation of the crane 1 measured using an accelerometer.

The list of exceptional events may further comprise a detection of the crane 1 being tilted in the wind, the associated event information corresponding to a measurement of a direction of the wind using one or more weather vanes.

The list of exceptional events may further comprise a detection of inappropriate behavior of the crane 1, the associated event information being detected by the control-command system 20.

The list of exceptional events may further comprise a crushing of the foundations of the crane 1, the associated event information corresponding to a measurement of an angle of inclination of the base of the crane 1.

The securing method then implements a step of association with levels of severity S2 consisting in associating, to each exceptional event of the list of exceptional events, with several levels of severity, each level of severity being a function of a value of the event information of at least one of the movement, load and safety sensors 3.

The level of severity is determined according to the values of the event information recorded by the movement, load and safety sensors 3 in different ways:

- either instantaneously, by creating in the control-command system 20 a programmed function that cannot be configured, in other words cannot be modified by the user, which instantly detects faults according to the values recorded by all the sensors as well as the consistency of these values, as for a brutal operation of the crane 1 for example.
- or almost instantaneously, at the time of the occurrence of the exceptional event, by creating in the event recorder a function programmed and possibly configurable by the user of the crane 1 which detects faults in the crane 1 as a function of the values recorded by all the movement, load and safety sensors 3 and the consistency of these values, such as for example an instantaneous maximum wind speed measured on the crane 1 in an interval of a few minutes centered on the moment of the occurrence of this wind.
- or by analysing, using the digital twin, the values of the parameters recorded in the history of the event recorder, as is the case during excessive use of the crane 1 or predictive maintenance.

Table 2 describes examples of factors taken into account to determine the level of severity.

TABLE 2

| Exceptional event | Factor(s) taken into account to determine the level of severity |
|---|---|
| an excessive exceedance of a measured temperature | When the crane is in use:<br>Crane temperature; and<br>Load spectrum; and<br>Wind speed.<br>When the crane is out of service:<br>Crane temperature; and<br>Wind speed. |
| an intensive use of the crane | Load spectrum; and<br>Crane using rate |
| a loss of a load from the crane | Detection of a fault imprint and<br>Value of the load; and<br>position of the truck at the time of the occurrence of the exceptional event |
| a crane overload | Permanent monitoring of the value of the load; and<br>Moment of the crane; and<br>Crane rotation speed. |
| a collision of the crane with an obstacle | Detection of a fault imprint and<br>Value of the load; and<br>position of the load and the crane at the time of the occurrence of the exceptional event. |
| a wind speed greater than a set wind speed limit | Permanent monitoring of wind speeds recorded on the crane. |
| a detection of autorotation or an oscillation of the crane | Detection of a defect fingerprint |
| a crushing of the foundations of the crane | Measurement of the inclination of the crane |

Then, a step of association with safety instruction S3 is implemented, said step consisting in associating, to each exceptional event and to each level of severity, with a safety instruction relating to the actuators 40, 41, 42 and defining at least one degree of limitation of at least one movement of the crane 1.

When the crane 1 is operating in a nominal operating mode, the securing method implements a step of detection of an exceptional event S4, consisting in detecting by the control-command system 20 an exceptional event from the list of exceptional events according to the event information from at least one of the movement, load and safety sensors 3.

Advantageously, the securing method makes it possible to activate or deactivate the detection of exceptional events according to their nature, as well as in certain cases, to define an alert level.

For example, a typical case is a wind speed to which the crane 1 is subjected, for which the user of the crane 1 registers in the control-command system 20 a wind speed limit value not to be exceeded and beyond which he will be alerted. This alert indicates to the user that he has exceeded the limit value he had set on the construction site. Thus, the stability of the crane 1 is therefore not endangered. On the other hand, if there are one or more alerts during the construction work, the crane user can understand that the assumptions adopted to estimate the wind speeds on the construction site are probably incorrect.

Advantageously, the securing method therefore allows the user of the crane 1 to improve and refine his prediction models.

Advantageously, and for example, the securing method allows a crane rental company or a material department of a construction company to impose a limitation on a given wind profile to ensure that its cranes are used in compliance with local rules concerning wind conditions.

If, for example, the crane 1 is subjected to site effects which have been poorly anticipated, an undesirable conditions of the crane 1 is then considerable. But if the user activates the securing method for this exceptional event, then the user can ensure that the behavior of the crane 1 is adequate in reasonable weather conditions, or that there is no risk of an undesirable condition before the occurrence of an excessive wind which will be the aggravating factor which may lead to an undesirable condition of the crane 1.

Advantageously, the user of the crane 1 can check the performance of his processes for setting up cranes, and in particular tower cranes, with minimal risk.

The securing method then implements a step of evaluation of a level of severity S5 consisting in evaluating by the control-command system 20 a level of severity of the detected exceptional event (the one detected during step S4) based on the value of the corresponding event information.

The exceptional event can then be classified as critical or non-critical depending on its nature. In addition to the nature of the exceptional event, there is an assessment of the level of severity of the exceptional event.

The severity levels can be defined according to the risk of damage to the crane 1:

- Level 0: risk of critical damage, imminent danger, security risk;
- Level 1: risk of critical damage;
- Level 2: risk of non-critical damage in the short-term;
- Level 3: risk of non-critical damage in the long-term.

For example, if the considered exceptional event is excessive exceedance of the minimum operating temperature of the crane 1, then:

- the severity level 0 corresponds to a crane operating temperature below −35° C., a maximum load greater than 70% of the maximum operating load supported by the crane 1 and a moment greater than 85% of the maximum moment of the crane 1.
- the severity level 1 corresponds to a crane operating temperature below −35° C., a maximum load greater than 50% of the maximum operating load supported by the crane 1 and a moment greater than 70% of the maximum moment of the crane 1.
- the severity level 2 corresponds to a crane operating temperature below −25° C., or a crane mounting temperature below −20° C.
- the severity level 3 corresponds to a crane operating temperature below −20° C., or a crane mounting temperature below −10° C.

According to one implementation mode, the control-command system 20 makes it possible to limit certain movements for different speed values or loads depending on the nature of the exceptional event and its level of severity.

According to one implementation mode, the control-command system 20 limits all the movements to a limited maximum speed and/or a load.

Then, the securing method implements a step of switching to secure operation S6, which consists in that the control-command system 20 switches the crane 1 from the nominal operating mode to a secure operating mode in which the control-command system 20 applies the safety instruction associated with the level of severity evaluated for the detected exceptional event.

The secure or degraded operating mode of the machine can be determined according to the nature of the exceptional event and its assessed severity.

According to one implementation mode of the securing method, the operation in degraded mode is managed directly by the control-command system 20 of the crane 1 which must be designed to do so.

In general, the crane 1 can have various modes of operation including:

- a nominal mode, in which the crane 1 is in service in a normal way, otherwise by performing the crane movements such as lifting, distributing etc. at normal speed.
- an out-of-service mode, in which there is a general cut in the energy supplying the crane 1, and in which a weather vane of the crane 1 is mechanically maintained.
- a mounting mode, reserved for an expert or technician in the installation of the crane 1 and accessible with the recording of an expert or technician code. In this mode, the crane 1 can only perform the movements necessary for its mounting.
- a learning mode, reserved for an expert in the installation of the crane 1 and accessible by recording an expert or technician code. In this mode, the crane 1 is adjusted after its mounting and before its commissioning.
- a maintenance mode or shunt mode, reserved for an expert in the installation of the crane 1 and accessible by recording an expert or technician code. In this mode, maintenance is carried out on the crane 1 and the crane 1 can be unblocked following its blocking during mounting.

The crane 1 can also be configured to switch to a secure operating mode following the occurrence of an exceptional event, for example.

The secure operating mode of the crane 1 can be selected from the following operating modes:

- «degraded 0» mode, in which only movements necessary to make the crane safe are authorized and after which the crane 1 cannot be started in an operating mode other than maintenance mode. In this mode, crane movements such as lifting, distributing, traveling are carried out at reduced speed and crane movement limiters are partially active.
- «degraded 1» mode, in which the crane 1 operates at a fraction of its maximum load or moment capacities. In this mode, crane movements such as lifting, distributing, traveling are carried out at reduced speed and the crane movement limiters are active.
- «degraded 2» mode, in which the crane 1 operates at a fraction of its speed capacities for one or more types of crane movement. In this mode, crane movements such as lifting, distributing, traveling are carried out at reduced speed and the crane movement limiters are active.

According to one possibility, the «degraded 1» and «degraded 2» modes can be activated simultaneously by the control-command system 20.

Thus, for example, if the crane 1 is in service following the occurrence of the exceptional event, the crane 1 can be configured to allow movements of the crane 1 at low speed, to allow a release of the load 5 and to switch out of service.

Advantageously, the switching to secure operation can be performed automatically by the control-command system 20.

Advantageously, the switching in secure operation cannot be prevented by the crane driver.

By way of example, if the detected exceptional event is excessive exceedance of the minimum ambient temperature for use of the crane 1, and if the severity level is evaluated at a severity level 0 then the control-command system 20 switches the operating mode of the crane 1 to «degraded 0» mode. If the severity level is evaluated at a severity level 1 or 2 then the control-command system 20 switches the operating mode of the crane 1 to «degraded 1» mode, and if the severity level is evaluated at a severity level 3 then the control-command system 20 displays on a display interface 22 an information message presenting the precautions to be taken when using the crane 1.

The display interface 22 can, for example, designate a screen connected to the control-command system 20 of the crane 1 and whose display can be seen by the crane driver.

According to one possibility, the display interface 22 is replaced or completed by a sound interface emitting a sound message perceptible by the crane driver.

The securing method then implements a step of transmission of an alert S7 consisting in a transmission by the control-command system 20 of an alert message informing of the occurrence of the exceptional event.

Once the exceptional event has been detected and the level of severity estimated, the user of the crane 1 is notified by means of alarms and by the display interface 22 of the control-command system 20 of the crane 1.

An alert message can for example be displayed on the display interface 22 and inform the crane driver of:

- the nature of the exceptional event;
- limitations imposed on the use of the crane 1, in the event that the crane 1 can still be used,
- instructions to follow for checking the crane 1 and restoring it to nominal operating condition.

According to one possibility, the control-command system 20 can carry out warning or preventive actions depending on the exceptional event detected as well as the severity of said exceptional event.

According to one possibility, the digital twin can be configured to inform a user of the crane 1 remotely, in other words not present on the site where the crane 1 is mounted.

Alternatively, cranes equipped with a digital twin communicate the real-time or slightly delayed alert message directly to the crane user.

According to one possibility, an alert message relating to the exceptional event, and possibly to the level of severity associated with the exceptional event, is associated with the safety instruction.

The application of the safety instructions implies that the control-command system 20 blocks the movements of the crane 1 or imposes limitations on the movements of the crane 1.

Depending on the nature and criticality of the exceptional event, the securing method implements different phases of return to nominal operation after switching the crane 1 to secure operating mode.

Figure 2:
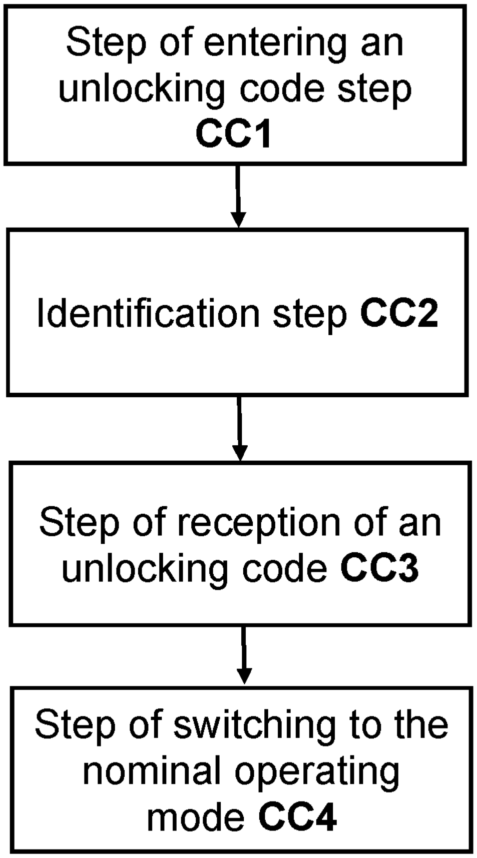
FIG. 2 is a flowchart presenting the steps implemented by the securing method of FIG. 1 during a return to nominal operation phase after a switching of the crane in secure operation following a detection of a critical exceptional event and an assessment of a critical severity level.

Thus, the list of exceptional events can comprise at least one critical exceptional event associated with at least one level of critical severity among the several levels of severity associated with said critical exceptional event, and in which after the step of switching to secure operation S6 following the detection of said critical exceptional event (at step S4) and the evaluation of said level of critical severity (at step S5), said securing method implements a return to nominal operation phase presented in FIG. 2 and comprising:

- a step of reception of an unlocking code CC3 consisting in a reception by the control-command system 20 of an unlocking code;
- a step of switching to the nominal operating mode CC4 consisting in a switching of the crane 1 by the control-command system 20 from the secure operating mode to the nominal operating mode, in response to the reception of said unlocking code.

The return to nominal operation phase may also comprise, before the step of reception of an unlocking code CC3, a step of entering an unlocking code CC1 consisting in an entering of the unlocking code on an entering interface 23 in communication with the control-command system 20, such as for example an interface integrated into the crane 1 or a remote interface in radiocommunication with the control-command system 20, as well as an identification step CC2 consisting in an identification of the unlocking code received in a series of unlocking codes prestored in the memory unit 21.

It is only on condition of having received the unlocking information that the control-command system 20 switches the crane 1 from the secure operating mode to the nominal operating mode.

The critical exceptional events require an inspection of the crane 1, of the site where the crane 1 is mounted and possibly handling of the crane 1 by competent personnel such as a technician or an expert.

By requiring entry of unlocking information or an individual expert code directly on the entering interface 23 connected to the control-command system 20 of the crane 1, the securing method advantageously makes it possible to identify the expert performing the unlocking operation.

Advantageously, the securing method requires the expert to travel to the site where the crane 1 is mounted in order to ascertain the causes and effects of the exceptional event.

Figure 3:
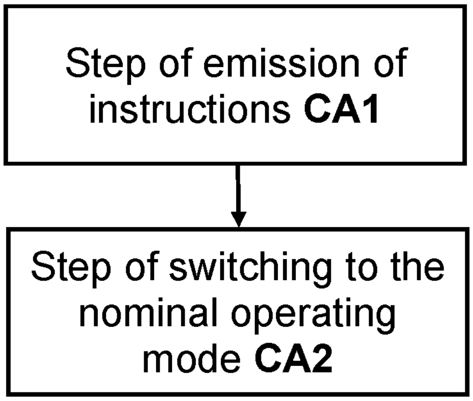
FIG. 3 is a flowchart presenting the steps implemented by the securing method of FIG. 1 during a return to nominal operation phase after the crane has switched to secure operation following a detection of a critical exceptional event and an assessment of a non-critical level of severity.

Furthermore, the list of exceptional events may comprise at least one critical exceptional event associated with at least one non-critical severity level distinct from the critical severity level(s) and in which, after the switching to secure operation following the detection of said critical exceptional event and the evaluation of said non-critical severity level, said securing method implements a return to nominal operation phase presented in FIG. 3 and comprising:

- a step of emission of instructions CA1 consisting in an emission by the control-command system 20 of a series of instructions characterizing the procedure to be followed for a return to the nominal operating mode;
- a step of switching to the nominal operating mode CA2 consisting in a switching of the crane 1 by the control-command system 20 from the secure operating mode to the nominal operating mode, in response to effective execution of the series of instructions.

Figure 4:
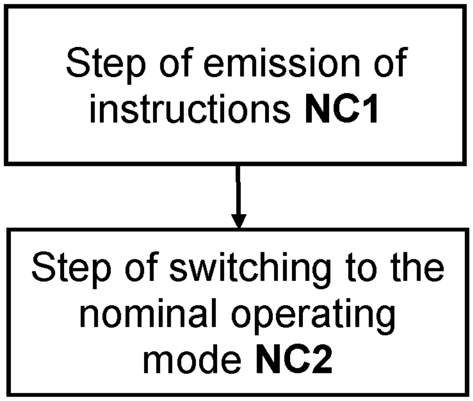
FIG. 4 is a flowchart presenting the steps implemented by the securing method of FIG. 1 during a return to nominal operation phase after the crane has switched to secure operation following a detection of a non-critical exceptional event regardless of the associated level of severity.
Figure 5:
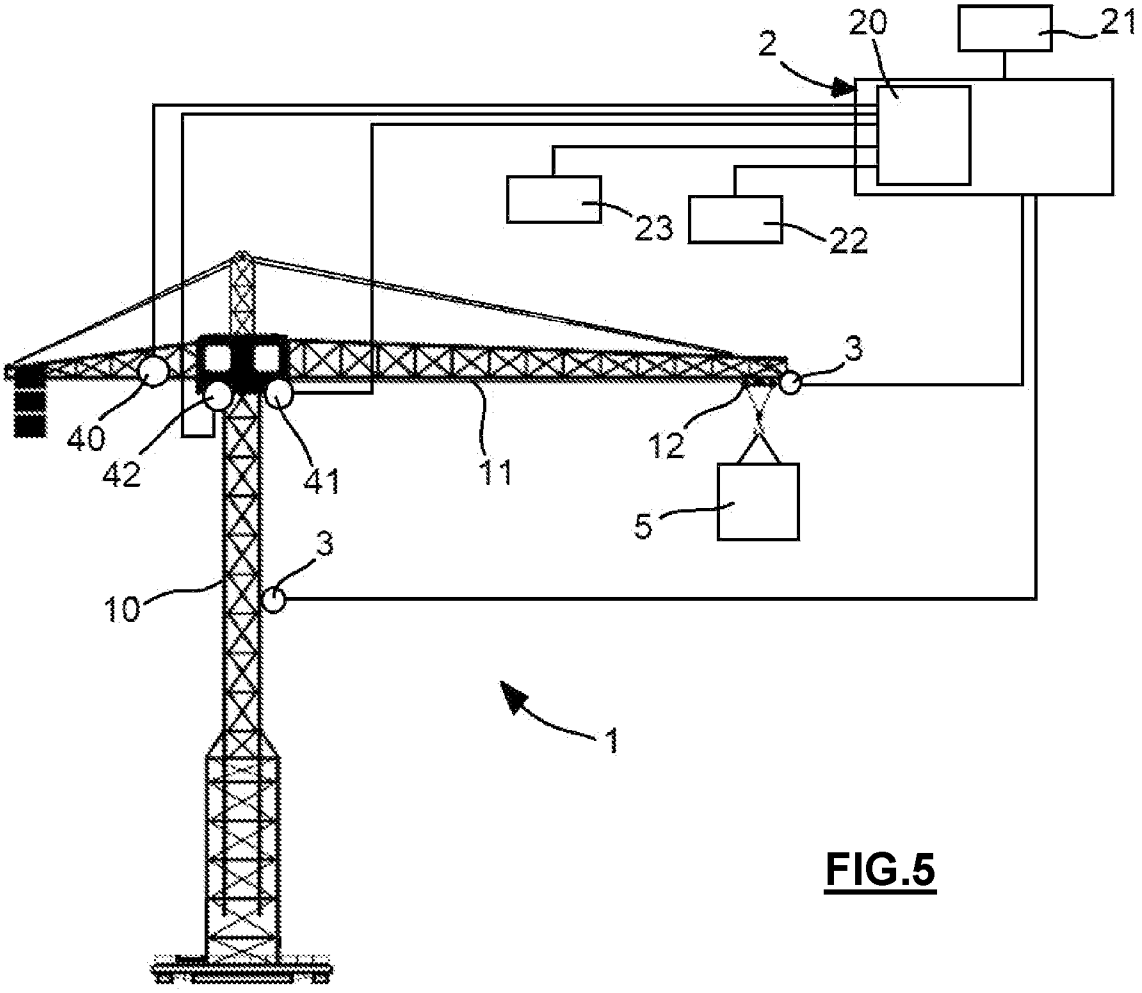
FIG. 5 is a schematic view of a crane according to an example of the disclosure.

According to one possibility, the list of exceptional events may comprise at least one non-critical exceptional event, distinct from the critical exceptional event(s), and in which after the switching to a secure operation following the detection of said non-critical exceptional event and regardless of the evaluation of the associated level of severity, said securing method implements a phase of return to nominal operation presented in FIG. 4 and comprising:

a step of emission of instructions NC1 consisting in an emission by the control-command system 20 of a series of instructions characterizing the procedure to be followed for a return to the nominal operating mode;

a step of switching to the nominal operating mode NC2 consisting in a switching of the crane 1 by the control-command system 20 from the secure operating mode to the nominal operating mode, in response to effective execution of the series of instructions.

Advantageously, the securing method allows the transmission to the crane driver of messages recorded in the control-command system 20 in the form of a series of instructions or recommendations once the exceptional event has been detected.

The digital twin can further be configured to allow the series of instructions or recommendations as well as the messages displayed on the display interface 22 to be updated according to the experience of users of the crane 1, in particular concerning frequent faults following the occurrence of the exceptional event, therefore faults for which the crane manufacturer must configure the fastest and easiest possible solution.

Advantageously, the securing method makes it possible to improve the overall level of safety of the use of tower cranes, in the medium and long term, by detecting exceptional events and without blocking the crane 1, but rather by limiting its productivity, or even stopping the crane 1 in case of imminent danger.

Advantageously, the crane 1 can be configured to switch to safe operating mode remotely by a crane manufacturer following the discovery on another crane of the same type or belonging to the same series of a potentially dangerous fault following upon the occurrence of the exceptional event.

According to one possibility, the securing method can be activated or deactivated by the user of the crane 1 for each exceptional event according to a risk of occurrence of said exceptional event in the crane 1.

According to one possibility, the security method can be activated by default, and the user of the crane 1 can choose to activate or deactivate it for each exceptional event.

Advantageously, the securing method makes it possible to use the crane 1 in degraded mode in order to continue a construction site or to secure the crane 1, with the aim of limiting losses of productivity on the construction site.

Advantageously, the securing method makes it possible to preserve a safety dimension in the site despite frequent or severe interruption of the operation of the crane 1.

Advantageously, the securing method can be configured to be implemented in the form of software, with minimal cost for the manufacturer and the user of the crane 1.

According to one possibility, the securing method can be integrated into the crane 1 as soon as the crane 1 is installed or implemented on the crane 1 subsequently to the installation of the crane 1 as an additional safety option.

Advantageously, the securing method can be implemented on different types of construction machines, other than cranes for example.

The invention further concerns the crane 1 comprising:

the processing unit 2, which can for example be a microcontroller, a microprocessor, or an electronic control card, connected to the movement, load and safety sensors 3 placed on the elements of the crane 1 (such as the mast 10 and/or the jib 11) and delivering respective event information representative of exceptional events;

the memory unit 21 connected to the processing unit 2, and storing the list of exceptional events detectable by means of movement, load and safety sensors 3, each exceptional event being associated with several levels of severity, each level of severity being a function of a value of the event information of at least one of the movement, load and safety sensors 3, and in which each exceptional event and for each level of severity is associated a safety instruction relating to the actuators 40, 41, 42 and defining at least one degree of limitation of at least one movement of the crane 1;

the control-command system 20 described above and connected to the actuators 40, 41, 42 of the crane 1 to manage movements of the crane 1 and of the load 5 suspended from the crane 1 and integrated within the processing unit 2 of the crane 1.

Moreover, and as described above, the control-command system 20 is configured for:

the crane 1 operating in a nominal operating mode, detecting an exceptional event from the list of exceptional events according to the event information from at least one of the movement, load and safety sensors 3;

assess the level of severity of the exceptional event according to the value of the corresponding event information;

switching the crane 1 from the nominal operating mode to a secure operating mode in which the control-command system 20 applies the safety instruction associated with the level of severity assessed for the detected exceptional event;

emitting an alert message informing of the occurrence of the exceptional event.

Although the invention has been described in conjunction with specific embodiments, it is obvious that it is in no way limited thereto and that it comprises all the technical equivalents of the means described as well as their combinations if these fall within the scope of the invention.

The invention claimed is:

1. A securing method for securing a crane on an occurrence of an exceptional event among a plurality of predefined exceptional events, the crane comprising a control-command system connected to actuators of the crane to manage movements of the crane and of a load suspended from the crane and integrated within a processing unit of the crane, the processing unit being connected to a plurality of sensors placed on elements of the crane and delivering respective event information representative of the exceptional events, and the securing method comprises the following steps of:

defining a list of exceptional events detectable by the plurality of sensors and storing the list of exceptional events in a memory unit connected to the processing unit;

defining secure operating modes, each of the secure operating modes being associated with a safety instruction relating to the actuators and defining at least one degree of limitation of at least one movement of the crane, said secure operating modes comprising the following modes:

a "degraded 0" mode, in which only movements necessary to make the crane safe are authorized;

a "degraded 1" mode, in which the crane operates at a fraction of its maximum load or moment capacities; and a "degraded 2" mode, in which the crane operates at a fraction of its speed capacity;

associating exceptional events of the list of exceptional events with levels of severity, each level of severity being a function of a value of the event information of at least one of the plurality of sensors;

associating the exceptional events and the levels of severity with one of the secure operating modes implementing the safety instruction relating to the actuators and defining at least one degree of limitation of at least one movement of the crane;

the crane operating in a nominal operating mode, detection by the control-command system of an exceptional event from the list of exceptional events according to the event information from at least one of the plurality of sensors;

evaluating by the control-command system of the level of severity of the detected exceptional event based on the value of the corresponding event information;

switching to a secure operation, comprising the control-command system switching the crane from the nominal operating mode to one of the secure operating modes by selecting one of the "degraded 0" mode, "degraded 1" mode and "degraded 2" mode, such that the control-command system applies the safety instruction associated with the severity level assessed for the detected exceptional event; and displaying by the control-command system an alert message informing of the occurrence of the exceptional event;

wherein the list of exceptional events comprises at least one critical exceptional event associated with at least one critical severity level among the severity levels associated with said critical exceptional event, and in which after the switching to the secure operation following the detection of said critical exceptional event and the evaluation of said critical severity level, said securing method implements a return to the nominal operation phase comprising:

receiving by the control-command system an unlocking code; and switching of the crane by the control-command system from the secure operating mode to the nominal operating mode, in response to the reception of said unlocking code; and wherein the at least one critical exceptional event is associated with at least one non-critical severity level distinct from the critical severity level(s) and in which after the switching to secure operation following the detection of said critical exception event and the evaluation of said non-critical severity level, said securing method implements a return to nominal operation phase comprising:

transmitting by the control-command system of a series of instructions characterizing a procedure to be followed for a return to the nominal operating mode; and switching of the crane by the control-command system from the secure operating mode to the nominal operating mode, in response to effective execution of the series of instructions.

2. The securing method according to claim 1, wherein the return to nominal operation phase comprises a step of entering the unlocking code on an entering interface in communication with the control-command system.

3. The securing method according to claim 1, wherein the return to nominal operation phase further comprises a step of identifying the unlocking code received in a series of unlocking codes pre-recorded in the memory unit.

4. The securing method according to claim 1, wherein the list of exceptional events comprises at least one non-critical exceptional event, distinct from the critical exceptional event(s), and in which after switching to secure operation following the detection of said non-critical exceptional event and regardless of an assessment of the associated level of severity, said securing method implements a return to nominal operation phase comprising:

transmitting by the control-command system of a series of instructions characterizing a procedure to be followed for a return to the nominal operating mode; and witching of the crane by the control-command system from the secure operating mode to the nominal operating mode, in response to effective execution of the series of instructions.

5. The securing method according to claim 1, wherein the list of exceptional events comprises at least the following event: exceedance of a predefined temperature, the associated event information corresponding to a measured temperature exceeding the predefined temperature.

6. The securing method according to claim 1, wherein the list of exceptional events comprises at least the following event: intensive use of the crane, the associated event information corresponding to a load spectrum value or to a load factor value calculated from a history of use of the crane.

7. The securing method according to claim 1, wherein the list of exceptional events comprises at least the following event: a loss of a load from the crane, the associated event information corresponding to a measured mass of the load lifted by the crane.

8. The securing method according to claim 1, wherein the list of exceptional events comprises at least the following event: an overload of the crane, the associated event information corresponding to a measured mass of the load carried by the crane.

9. The securing method according to claim 1, wherein the list of exceptional events comprises at least the following event: an accidental overload of the crane in operation greater than 125% of a maximum operating load of the crane, the associated event information corresponding to a measured load detected by a load measurement sensor.

10. The securing method according to claim 1, wherein the list of exceptional events comprises at least the following event: a collision of the crane with an obstacle, the associated event information corresponding to a signal of collision transmitted by a sensor mounted on the crane.

11. The securing method according to claim 1, wherein the list of exceptional events comprises at least the following event: a wind speed greater than a defined wind speed limit, the associated event information corresponding to a measure of wind speed.

12. The securing method according to claim 1, wherein the list of exceptional events comprises at least the following event: detection of autorotation or oscillation of the crane, the associated event information corresponding to a moment of rotation of the crane measured using an accelerometer.

13. The securing method according to claim 1, wherein the list of exceptional events comprises at least the following event: detection of the crane being put across in wind, the associated event information corresponding to a measurement of a wind direction using one or more wind vanes.

14. The securing method according to claim 1, wherein the list of exceptional events comprises at least the following event: detection of a selected inappropriate behavior of the crane, the associated event information being detected by the control-command system.

15. The securing method according to claim 1, wherein the list of exceptional events comprises at least the following event: a crushing of foundations of the crane, the associated event information corresponding to a measurement of an angle of inclination of the base of the crane.

16. A crane comprising:

a processing unit connected to a plurality of sensors placed on elements of the crane and delivering respective event information representative of exceptional events;

a memory unit connected to the processing unit, and storing a list of exceptional events detectable by the plurality of sensors, each exceptional event being associated with levels of severity, each level of severity being a function of a value of the event information of at least one of the plurality of sensors, and in which each exceptional event and for each level of severity is associated with a safety instruction relating to actuators and defining at least one degree of limitation of at least one movement of the crane;

a control-command system connected to actuators of the crane to manage movements of the crane and of a load suspended from the crane and integrated within the processing unit of the crane, said control-command system being configured for:

the crane operating in a nominal operating mode, detecting an exceptional event from the list of exceptional events according to the event information from at least one of the plurality of sensors;

assessing the level of severity of the exceptional event according to the value of the corresponding event information;

switching the crane from the nominal operating mode to at least one of a secure operating modes in which the control-command system applies the safety instruction associated with the level of severity assessed for the detected exceptional event;

displaying an alert message informing of an occurrence of the exceptional event; and wherein the secure operating modes comprise:

a "degraded 0" mode, in which only movements necessary to make the crane safe are authorized;

a "degraded 1" mode, in which the crane operates at a fraction of its maximum load or moment capacities; and a "degraded 2" mode, in which the crane operates at a fraction of its speed capacity;

wherein the list of exceptional events comprises at least one critical exceptional event associated with at least one critical severity level among the severity levels associated with said critical exceptional event, and in which after the switching to the at least one of the secure operating modes following the detection of said critical exceptional event and the evaluation of said critical severity level, the control-command system is configured for receiving an unlocking code and for switching the crane to the nominal operating mode in response to the reception of said unlocking code; and wherein at least one critical exceptional event is associated with at least one non-critical severity level distinct from the critical severity level(s) and in which after the switching to secure operation following the detection of said critical exceptional event and the evaluation of said non-critical severity level, said control-command system is configured to implement a return to nominal operation phase by transmitting by the control-command system of a series of instructions characterizing a procedure to be followed for a return to the nominal operating mode; and switching of the crane by the control-command system from the secure operating mode to the nominal operating mode, in response to effective execution of the series of instructions.

17. A securing method for securing a crane on an occurrence of an exceptional event among a plurality of predefined exceptional events, the crane comprising a control-command system connected to actuators of the crane to manage movements of the crane and of a load suspended from the crane and integrated within a processing unit of the crane, the processing unit being connected to a plurality of sensors placed on elements of the crane and delivering respective event information representative of the exceptional events, and the securing method comprises the following steps of:

defining a list of exceptional events detectable by the plurality of sensors and storing the list of exceptional events in a memory unit connected to the processing unit;

defining secure operating modes, each of the secure operating modes being associated with a safety instruction relating to the actuators and defining at least one degree of limitation of at least one movement of the crane, said secure operating modes comprising the following modes:

a "degraded 0" mode, in which only movements necessary to make the crane safe are authorized;

a "degraded 1" mode, in which the crane operates at a fraction of its maximum load or moment capacities; and a "degraded 2" mode, in which the crane operates at a fraction of its speed capacity;

associating exceptional events of the list of exceptional events with levels of severity, each level of severity being a function of a value of the event information of at least one of the plurality of sensors;

associating the exceptional events and the levels of severity with one of the secure operating modes implementing the safety instruction relating to the actuators and defining at least one degree of limitation of at least one movement of the crane;

the crane operating in a nominal operating mode, detection by the control- command system of an exceptional event from the list of exceptional events according to the event information from at least one of the plurality of sensors;

evaluating by the control-command system of the level of severity of the detected exceptional event based on the value of the corresponding event information;

switching to a secure operation, comprising the control-command system switching the crane from the nominal operating mode to one of the secure operating modes by selecting one of the "degraded 0" mode, "degraded 1" mode and "degraded 2" mode, such that the control-command system applies the safety instruction associated with the severity level assessed for the detected exceptional event; and displaying by the control-command system an alert message informing of the occurrence of the exceptional event;

wherein the list of exceptional events comprises at least one critical exceptional event associated with at least one critical severity level among the severity levels associated with said critical exceptional event, and in which after the switching to the secure operation following the detection of said critical exceptional event and the evaluation of said critical severity level, said securing method implements a return to the nominal operation phase comprising:

receiving by the control-command system an unlocking code; and switching of the crane by the control-command system from the secure operating mode to the nominal operating mode, in response to the reception of said unlocking code; and wherein the list of exceptional events comprises at least one non-critical exceptional event, distinct from the critical exceptional event(s), and in which after switching to secure operation following the detection of said non-critical exceptional event and regardless of an assessment of the associated level of severity, said securing method implements a return to nominal operation phase comprising:

transmitting by the control-command system of a series of instructions characterizing a procedure to be followed for a return to the nominal operating mode; and switching of the crane by the control-command system from the secure operating mode to the nominal operating mode, in response to effective execution of the series of instructions.

18. A crane comprising:

a processing unit connected to a plurality of sensors placed on elements of the crane and delivering respective event information representative of exceptional events;

a memory unit connected to the processing unit, and storing a list of exceptional events detectable by the plurality of sensors, each exceptional event being associated with levels of severity, each level of severity being a function of a value of the event information of at least one of the plurality of sensors, and in which each exceptional event and for each level of severity is associated with a safety instruction relating to actuators and defining at least one degree of limitation of at least one movement of the crane;

a control-command system connected to actuators of the crane to manage movements of the crane and of a load suspended from the crane and integrated within the processing unit of the crane, said control-command system being configured for:

the crane operating in a nominal operating mode, detecting an exceptional event from the list of exceptional events according to the event information from at least one of the plurality of sensors;

assessing the level of severity of the exceptional event according to the value of the corresponding event information;

switching the crane from the nominal operating mode to at least one of a secure operating modes in which the control-command system applies the safety instruction associated with the level of severity assessed for the detected exceptional event;

displaying an alert message informing of an occurrence of the exceptional event; and wherein the secure operating modes comprise:

a "degraded 0" mode, in which only movements necessary to make the crane safe are authorized;

a "degraded 1" mode, in which the crane operates at a fraction of its maximum load or moment capacities; and a "degraded 2" mode, in which the crane operates at a fraction of its speed capacity;

wherein the list of exceptional events comprises at least one critical exceptional event associated with at least one critical severity level among the severity levels associated with said critical exceptional event, and in which after the switching to the at least one of the secure operating modes following the detection of said critical exceptional event and the evaluation of said critical severity level, the control-command system is configured for receiving an unlocking code and for switching the crane to the nominal operating mode in response to the reception of said unlocking code; and wherein the list of exceptional events comprises at least one non-critical exceptional event, distinct from the critical exceptional event(s), and in which after switching to secure operation following the detection of said non-critical exceptional event and regardless of an assessment of the associated level of severity, said control-command system is configured to implement a return to nominal operation phase by transmitting by the control-command system of a series of instructions characterizing a procedure to be followed for a return to the nominal operating mode; and switching of the crane by the control-command system from the secure operating mode to the nominal operating mode, in response to effective execution of the series of instructions.

* * * * *